Patented Nov. 29, 1938

2,138,757

UNITED STATES PATENT OFFICE 2,138,757

PURIFICATION OF CELLULOSE ETHERS

William R. Collings and Toivo A. Kauppi, Midland, Mich., assignors to The Dow Chemical Company, Midland, Mich., a corporation of Michigan No Drawing. Application April 28, 1937, Serial No. 139,584

4 Claims. (Cl. 260—152)

This invention relates to an improved process for the purification and bleaching of cellulose ethers, and is primarily concerned with a purification process which avoids any material degradation of the ether, and hence does not substantially reduce its viscosity. This invention is concerned, therefore, with the purification of crude cellulose ethers so as to yield a purified product having approximately the same viscosity as the crude ether.

The usual methods for the preparation of cellulose ethers result in the production of materials, the solutions of which with the usual solvents have undesirable color and marked turbidity, and form suspensions which are difficult of clarification. Such crude product contains partially etherified cellulose fibers, together with compounds of the heavy metals and other inorganic salts, all of which are present as dissolved, occluded, or combined impurities in the cellulose ether. Films produced from solutions of such crude cellulose ethers exhibit considerable haziness and are frequently discolored to such an extent that the film is unsatisfactory for commercial applications.

The usual methods for the purification of cellulose ethers result in partial degradation of the ether and in a material reduction in the viscosity theerof. It has been difficult to control the purification in such a manner that a product capable of forming a solution of any predetermined viscosity may be obtained. For the decolorization of cellulose derivatives an alkaline hypochlorite has been used, which is added to an aqueous suspension of the cellulose derivative in amount corresponding to between 1 and 2 per cent by weight of available chlorine. Such purification is carried out at temperatures from 20° to 50° C., for from 1 to 18 hours, and is primarily intended for the purification of cellulose esters. It is entirely unsatisfactory for use with cellulose ethers, since it results in non-uniform bleaching and in an undesirable surface oxidation of the suspended particles of the cellulose ether, forming an unstable product.

An object of the invention is to provide a process whereby pure cellulose ethers may be prepared from crude cellulose ethers without materially altering the viscosity thereof. Another object is to provide a method whereby hypochlorites may be employed satisfactorily in the purification of discolored cellulose ethers. A particular object is to provide a method whereby pure ethyl cellulose capable of forming colorless solutions and clear, haze-free films may be prepared from crude ethyl cellulose without materially affecting the viscosity thereof.

We have now found that in purifying crude cellulose ethers the above objects can be attained by treating with hypochlorous acid or an alkaline hypochlorite, a solution of the crude ether. The solvents for the ether which we have found suitable for use in our process comprise a major proportion of an alcohol-type compound, e. g., the mono-hydric alcohols, ether alcohols, and alcohol esters, which are miscible with water under the conditions used. The quantity of hypochlorous acid or alkaline hypochlorite employed should be sufficient to liberate chlorine equivalent to between about 1 per cent and about 6 per cent by weight of the crude cellulose ether. The treatment may be carried out at room temperature and requires only a relatively short period of time, e. g., from 10 minutes to about 1 hour. If hypochlorous acid is used as the purifying agent, it is desirable to make the solutions alkaline following the purification treatment and prior to recovering the cellulose ether. If an alkaline hypochlorite is used for the purification of a crude cellulose ether, two procedures have been found satisfactory. According to one modification the solution of the crude cellulose ether may be acidified slightly, suitably with hydrochloric acid or acetic acid, and an alkaline hypochlorite gradually added to the acidified solution in an amount such that the available chlorine introduced will be equivalent to between about 1 per cent and about 6 per cent by weight of the crude cellulose ether. The amount of acid employed in the pretreatment of the cellulose ether solution is generally selected so as to be insufficient to neutralize all of the alkali in the amount of hypochlorite solution employed. After all of the hypochlorite has been added, the cellulose ether solution has an alkaline reaction. In another modification, the solution of crude cellulose ether is purified by the addition of an alkaline hypochlorite without previously being acidified. In either case the ether can be precipitated by mixing the solution with water.

In a preferred method of carrying out our invention a crude cellulose ether is mixed with an alcohol-type compound in the approximate ratio of 15 parts of the ether to 85 parts of alcohol by weight. In the case of ethyl alcohol, for example, up to 20 per cent by volume of water may be present in the ether solution without materially precipitating the ether. This solution, preferably after filtration, is made slightly acid with glacial acetic acid or concentrated hydrochloric acid. A sodium hypochlorite solution containing between 125–135 grams of available chlorine per liter is added slowly to the acidified solution of cellulose ether, over a period usually not in excess of 15 minutes, until there has been introduced into the solution between about 2 and about 4 per cent of available chlorine, based on the weight of the dissolved cellulose ether. The preferred hypochlorite solution is prepared by passing chlorine into 10–30 per cent sodium hydroxide solution.

The crude ether mixture is agitated during the addition of the sodium hypochlorite, and, when all of the latter reagent has been added, the solution has an alkaline reaction. The alkaline solution is then allowed to stand until substantially all of the chlorine is consumed, which ordinarily requires from 10 to 60 minutes. It may then be filtered, if necessary, to remove suspended matter and the clear filtrate is slowly run into boiling water, causing the alcohol to be volatilized and the cellulose ether to be precipitated. The latter is filtered from the aqueous suspension, washed with pure water until the filtrate shows no further traces of chlorides, and dried. Solutions of the dried product in alcohol, toluene, benzene, or mixtures of these solvents, are colorless and haze-free, and films produced from such solutions have high tensile strength.

Since no appreciable advantage, as evidenced by removal of color, is obtained at higher temperatures and with shorter reaction times, the process is ordinarily carried out at room temperature and in a period of about 1 hour. It is essential to the successful operation of the process to use a solvent for the cellulose ether containing appreciable amounts of an aliphatic mono-hydric alcohol, a mono-hydroxy aliphatic ether, or a mono-hydroxy aliphatic ester. Such liquids act as "buffers" or "shock-absorbers" in the reaction mixture, as they modify the intensity of the reaction and minimize the degrading effect of the hypochlorite on the cellulose ether molecule, themselves being reacted on by some of the excess hypochlorite present.

For purposes of comparison between solutions of ethyl cellulose, we have adopted a series of arbitrary color standards, wherein the number 1 serves to designate a water-white solution and succeeding numbers refer to solutions having color in increasing intensity, the number 10 indicating a solution having a very pale yellow-brown, yellow-green, or slate coloration similar in intensity to the lower end of the standard "caramel" color scale used by lacquer manufacturers. Numerals from 1 to 5 designate the color characteristics of solutions which will give films entirely satisfactory for most industrial applications, while the numerals 1 to 3 refer to solutions meeting more exacting requirements. The cellulose ether solutions used for the determination of color and of viscosity characteristics, and hereinafter referred to as "standard solutions", were prepared by dissolving the cellulose ether to the extent of 5 per cent by weight in a mixture of 20 parts of ethyl alcohol and 80 parts of toluene, by volume.

The stability tests referred to in the following examples were carried out by heating a film prepared from a standard solution of a cellulose ether to a temperature of 120° C. for 16 hours in a closed container, redissolving the film to form a standard solution and determining the viscosity thereof. The index of stability is the percentage of the original viscosity retained after the heat treatment.

The following examples illustrate the practice of our invention:

*Example 1*

A 15 per cent solution of ethyl cellulose in 95 per cent ethanol was made slightly acid with acetic acid, and was treated with sufficient sodium hypochlorite solution containing about 125 grams of available chlorine per liter to introduce into the mixture about 3 per cent available chlorine, based on the weight of the ethyl cellulose in the solution. The mixture was stirred at room temperature for 30 minutes. There was then present approximately 0.02 per cent of sodium hydroxide based on the entire weight of the mixture. The solution was run slowly into boiling water, and the alcohol was flashed from the mixture, while the cellulose ether was precipitated in water. The ethyl cellulose was recovered by filtration, washed and dried. A standard solution thereof had a color of 1+, was 100 per cent stable, and had a viscosity of 19 centipoises. The unbleached material which had been used in this experiment was 83 per cent stable, and standard solutions thereof had a color of 4 and a viscosity of 19 centipoises.

*Example 2*

Ethyl cellulose from another batch of material, which was 91 per cent stable and whose standard solution exhibited a color of 3 and had a viscosity of 35 centipoises, was treated in a manner identical with that described in the foregoing example. The final product had a color of 1+ and a viscosity of 35 centipoises when dissolved to form a standard solution. Films produced therefrom were 98 per cent stable.

*Example 3*

In a similar manner, an ethyl cellulose, whose standard solution exhibited a color of 6, had a viscosity of 20 centipoises, and produced films which were 97 per cent stable, yielded a purified product whose standard solution had a color of 1+, a viscosity of 22 centipoises, and which deposited films whose stability was 97 per cent.

*Example 4*

A 15 per cent solution of ethyl cellulose in ethyl alcohol was treated with sodium hypochlorite without previously acidifying the solution. The mixture was stirred for approximately 1 hour and was then run into hot water so as to drive off the solvent and recover the ethyl cellulose in a manner substantially as described in the foregoing examples. The purified product formed films which were 99 per cent stable and whose standard solutions had a color of 1. The untreated product formed standard solutions, the color of which was between 3 and 4.

While the process has been illustrated with reference to purification of alcoholic solutions of crude ethyl cellulose, it is equally applicable to the purification of other cellulose ethers such as methyl, propyl, butyl, benzyl, ethyl-propyl, methyl-ethyl, or ethyl-benzyl cellulose. Other mono-hydric alcohols may be employed as the reaction medium, for example, methyl alcohol, propyl alcohol, isopropyl alcohol, and butyl alcohol. Other suitable mono-hydroxy alcoholic solvents include the mono-hydroxy alkyl ethers as well as the mono-hydroxy-alkyl esters of aliphatic carboxylic acids; for example, ethylene glycol mono-ethyl ether, ethylene glycol mono-butyl ether, ethylene glycol mono-acetate, etc. These compounds all contain a free hydroxy group and are alcoholic in nature. A small proportion of the alcoholic solvent is oxidized during the purification step. The oxidation products resulting from such reaction between the alcohol employed and sodium hypochlorite are aldehydes or ketones, and chloroform, the boiling points of which are lower than those of the corresponding alcohol. These products are readily removed from the mixture in the step of simultaneously flashing off the solvent and precipitating the cellulose ether.

Other modes of applying the principle of our invention may be employed instead of the one explained, change being made as regards the process herein disclosed, provided the step or steps stated by any of the following claims or the equivalent of such stated step or steps be employed.

We, therefore, particularly point out and distinctly claim as our invention:

1. In a method of treating a crude alkyl ether of cellulose, the steps which consist in subjecting the crude ether to the action of an agent containing sufficient available chlorine to decolorize the crude ether and to improve its stability to degradation at elevated temperatures, while the crude ether is dissolved in a material selected from the group consisting of mono-hydric alcohols, ether alcohols, and alcohol esters, which are miscible with water; and, after the available chlorine has been reacted, precipitating the cellulose ether from an alkaline solution.

2. In a method of treating a crude alkyl ether of cellulose, the steps which consist in subjecting the crude ether to the action of a sufficient amount of an alkaline hypochlorite to decolorize the ether and to improve its stability to degradation at elevated temperatures, while the crude ether is dissolved in a material selected from the group consisting of mono-hydric alcohols, ether alcohols, and alcohol esters, which are miscible with water; and, after the available chlorine has been reacted, precipitating the crude ether from the alkaline solution.

3. In a method of treating a crude alkyl ether of cellulose, the steps which consist in subjecting the crude ether to the action of a sufficient quantity of hypochlorous acid to decolorize the ether and to improve its stability to degradation at elevated temperatures, while the crude ether is dissolved in a material selected from the group consisting of mono-hydric alcohols, ether alcohols, and alcohol esters, which are miscible with water; making the solution alkaline after the available chlorine has been reacted and precipitating the purified cellulose ether from the alkaline solution.

4. In a method of treating ethyl cellulose, the steps which consist in subjecting the crude ether to the action of an agent containing sufficient available chlorine to decolorize the crude ether and to improve its stability to degradation at elevated temperatures, while the crude ether is dissolved in a material selected from the group consisting of mono-hydric alcohols, ether alcohols, and alcohol esters, which are miscible with water; and, after the available chlorine has been reacted, precipitating the ethyl cellulose from an alkaline solution.

WILLIAM R. COLLINGS.
TOIVO A. KAUPPI.